US010432932B2

(12) United States Patent
Valin et al.

(10) Patent No.: US 10,432,932 B2
(45) Date of Patent: Oct. 1, 2019

(54) DIRECTIONAL DERINGING FILTERS

(71) Applicant: Mozilla Corporation, Mountain View, CA (US)

(72) Inventors: Jean-Marc Valin, Montreal (CA); Timothy B. Terriberry, Mountain View, CA (US)

(73) Assignee: Mozilla Corporation, Mountain View, CA (US)

( * ) Notice: Subject to any disclaimer, the term of this patent is extended or adjusted under 35 U.S.C. 154(b) by 454 days.

(21) Appl. No.: 15/200,549

(22) Filed: Jul. 1, 2016

(65) Prior Publication Data

US 2017/0013260 A1   Jan. 12, 2017

Related U.S. Application Data

(60) Provisional application No. 62/191,227, filed on Jul. 10, 2015.

(51) Int. Cl.
| | |
|---|---|
| *H04N 19/117* | (2014.01) |
| *H04N 19/124* | (2014.01) |
| *H04N 19/13* | (2014.01) |
| *H04N 19/159* | (2014.01) |
| *H04N 19/176* | (2014.01) |
| *H04N 19/182* | (2014.01) |
| *H04N 19/43* | (2014.01) |

(Continued)

(52) U.S. Cl.
CPC ......... *H04N 19/117* (2014.11); *H04N 19/124* (2014.11); *H04N 19/136* (2014.11); *H04N 19/176* (2014.11); *H04N 19/86* (2014.11)

(58) Field of Classification Search
CPC . G06T 5/002; G06T 5/20; G06T 2207/20012; G06T 2207/20192; G06T 2207/10024; G06T 2207/20021; G06T 11/001; H04N 19/117; H04N 19/86; H04N 1/409; H04N 1/4092; H04N 5/142; H04N 9/045; H04N 9/646
See application file for complete search history.

(56) References Cited

U.S. PATENT DOCUMENTS

| | | | |
|---|---|---|---|
| 6,907,144 B1 * | 6/2005 | Gindele | G06T 5/20 382/262 |
| 6,996,281 B2 * | 2/2006 | Boliek | H03M 7/30 375/E7.016 |

(Continued)

*Primary Examiner* — Dave Czekaj
*Assistant Examiner* — Kehinde Abimbola
(74) *Attorney, Agent, or Firm* — Dergosits & Noah LLP; Todd A. Noah

(57) ABSTRACT

Systems and methods are described for removing ringing artifacts from a coded image. For each block of coded image data, a direction is identified by selecting a directional block divided into a plurality of pixel lines in one predetermined direction of a set of at least four predetermined directions. The directional block may have a constant value across each pixel line. A parameter related to a sum of a mean-square difference between a pixel value and the pixel average of pixels falling on a pixel line in the directional block that includes the location of the pixel may be calculated for each direction of the set. The direction of the set having a minimum summed mean-square difference is selected as the direction for the block based on the calculated parameter values. A non-linear filter is then applied to each block based on the identified direction for the block.

20 Claims, 10 Drawing Sheets

(51) Int. Cl.
*H04N 19/61* (2014.01)
*H04N 19/136* (2014.01)
*H04N 19/86* (2014.01)

(56) References Cited

U.S. PATENT DOCUMENTS

| | | | | |
|---|---|---|---|---|
| 6,999,630 B1* | 2/2006 | Drouot | ............ | G06T 9/00 |
| | | | | 348/606 |
| 7,382,925 B2* | 6/2008 | Boliek | ............ | H03M 7/30 |
| | | | | 375/E7.044 |
| 8,615,391 B2* | 12/2013 | Kim | ............ | G10L 19/02 |
| | | | | 370/203 |
| 2004/0114810 A1* | 6/2004 | Boliek | ............ | H03M 7/30 |
| | | | | 382/232 |
| 2006/0023963 A1* | 2/2006 | Boliek | ............ | H03M 7/30 |
| | | | | 382/240 |
| 2007/0016404 A1* | 1/2007 | Kim | ............ | G10L 19/02 |
| | | | | 704/200.1 |
| 2011/0069883 A1* | 3/2011 | Fujisawa | ............ | H04N 1/409 |
| | | | | 382/170 |
| 2011/0141368 A1* | 6/2011 | Wallace | ............ | H04N 1/4092 |
| | | | | 348/606 |
| 2013/0027590 A1* | 1/2013 | Park | ............ | G06T 5/002 |
| | | | | 348/241 |

* cited by examiner

FIG. 4

DIRECTIONAL DERINGING FILTERS

CROSS-REFERENCE TO RELATED APPLICATIONS

This application claims the benefit of U.S. Provisional Application No. 62/191,227, filed Jul. 10, 2015, which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital encoding and decoding, and more specifically to reducing coding artifacts using a post-processing deringing filter on a coded image.

SUMMARY OF THE INVENTION

Systems and methods are described for removing ringing artifacts from a coded image using an encoder and/or a decoder. A processor may receive coded image data for an image that has undergone quantization. The coded image data may be divided into a plurality of blocks. For each block of the coded image data, a direction may be identified by selecting a directional block. The directional block may have the same number of pixels as the block and is divided into a plurality of pixel lines, the pixel lines having one of a set of at least four predetermined directions, the directional block having a constant value across each pixel line. A parameter related to a sum of a mean-square difference between a pixel value of each pixel of the block and the constant value of a pixel line of the directional block that includes the location in the block of the corresponding pixel may be calculated for each of the set of at least four predetermined directions. The direction of the set of at least four predetermined directions having a parameter value related to the minimum summed mean-square difference may be selected as the direction for the block. A non-linear filter may be applied to each block of the coded image data, the non-linear filter for each block being based on the identified direction for the block, thereby transforming the blocks of the image into filtered blocks of the image. The processor may then store the filtered blocks of the image in a data store.

The systems and methods described herein remove ringing artifacts from coded images and videos. The calculated filter may advantageously, by accounting for the directionality of the patterns for each received block that is filtered, reduce the risk of blurring inherent in using conventional deringing filters. In addition to the foregoing, in various embodiments a conditional replacement filter may be calculated and applied to each block of the image. Also, in some embodiments a second filtering stage may be calculated and applied to the filtered blocks of the image.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 4 shows line numbers for pixels following a predetermined direction in a block in an exemplary embodiment of the present invention.

DETAILED DESCRIPTION

The described deringing filter takes into account the direction of edges and patterns being filtered. The filter works by identifying the direction of each block and then adaptively filtering along the identified direction. In an exemplary embodiment, a second pass is made by a second nonlinear filter that filters the blocks in a different direction or directions. The second nonlinear filter may utilize a more conservative threshold than the first nonlinear filter, to avoid blurring edges. While embodiments below show the deringing filter as part of a video encoder, the present invention is not limited in this regard. The deringing filter may also be used in a still image encoder/decoder, or in a standalone image enhancement program, for example.

Figure 1:
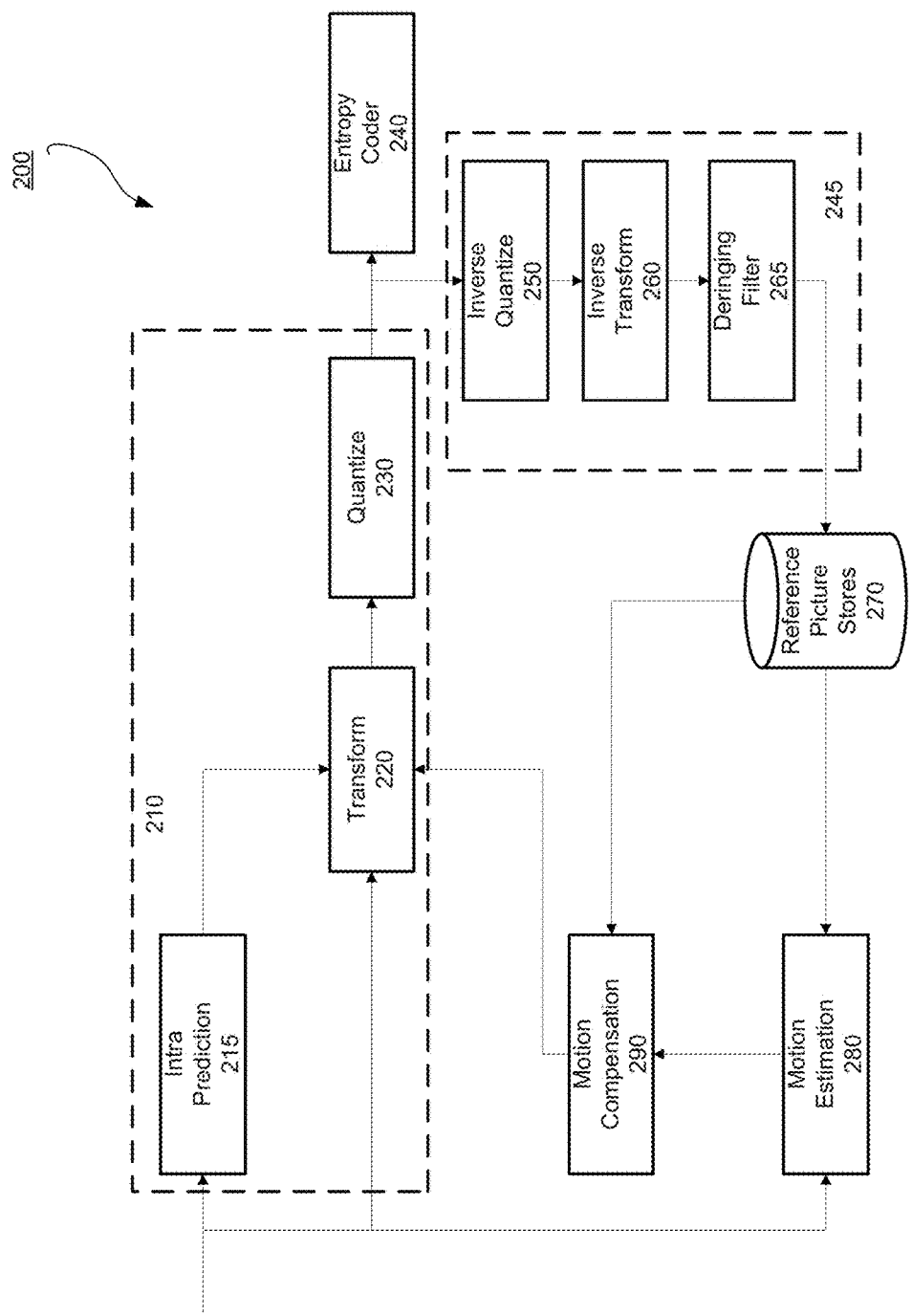
FIG. 1 shows a system diagram for a video encoder that uses a directional deringing filter, under an embodiment.

FIG. 1 shows a system diagram for a video encoder 200 that uses a directional deringing filter, under an embodiment. The exemplary encoder 200 includes encoding modules 210 used to code images received as inputs. Encoder 200 may also include decoding modules 245 used to decode an encoded image, the decoding modules 245 including a deringing filter block 265, described in further detail below.

The encoder may receive the input video stream and transform the image data using, for example, block transform function 220. An input to the encoder 200 may be communicatively coupled with (possibly overlapped) block transform function 220. Encoder 200 may also include intra prediction block 215 in some embodiments, which may compute a reflection plane and apply the reflection to the received input image data.

The output of the intra prediction block 215 may be communicatively coupled to block transform unit 220, such that the intra prediction data may be used in performing transforms to the received image data. The block transform unit 220 may be used to apply compression techniques to the input video stream, using any set of transformations to the received image data. In an exemplary embodiment, the transform unit 220 may implement an overlapped transform function. The transform unit 220 may be communicatively coupled to a quantizer 230, which may in some embodiments be a pyramid vector quantizer (PVQ), or any other suitable quantizer. It shall be understood that a separate quantizer parameter determination unit for rate control may feed the quantizer 230 in alternate embodiments, with the signaling between the units indicating which quantizer parameter to use.

The encoder may compute, quantize, and/or code an angle and other dimensions of a block of the received image data using quantizer 230 in some embodiments. The output of the quantizer 230 may be connected in signal communication with an entropy coder 240 for additional compression. The output of the entropy coder 240 may be an externally available output of the encoder 200.

The output of the quantizer 230 may further connected in signal communication with an inverse quantizer 250, which decodes the coded image data. The inverse quantizer 250 may be used to inverse quantize the received coded image data. The inverse quantizer 250 may be coupled in signal communication with an inverse block transform function 260. The inverse block transform function 260 performs an inverse block transform on the coded image data, which may essentially be the inverse of the transform described above. Inverse block transform function 260 may in turn be coupled in signal communication with a deringing filter 265, which performs deringing processing on the coded image data. The deringing is described below in further detail. After the deringing filter 265 processing is complete, the filtered image data may be provided to a reference picture store 270. A first output of the reference picture store 270 is connected in signal communication with a first input of a motion estimator 280 for multiple reference pictures. The input to the encoder 200 is further connected in signal communication with a second input of the motion estimator 280.

The output of the motion estimator 280 is connected in signal communication with a first input of a motion compensator 290. A second output of the reference picture store 270 is connected in signal communication with a second input of the motion compensator 290. The output of the motion compensator 290 is connected in direct signal communication with third input of the transform unit 220.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Aspects of the one or more embodiments described herein may be implemented on one or more computers or processor-based devices executing software instructions. The computers may be networked in a peer-to-peer or other distributed computer network arrangement (e.g., client-server), and may be included as part of an audio and/or video processing and playback system.

Figure 2:
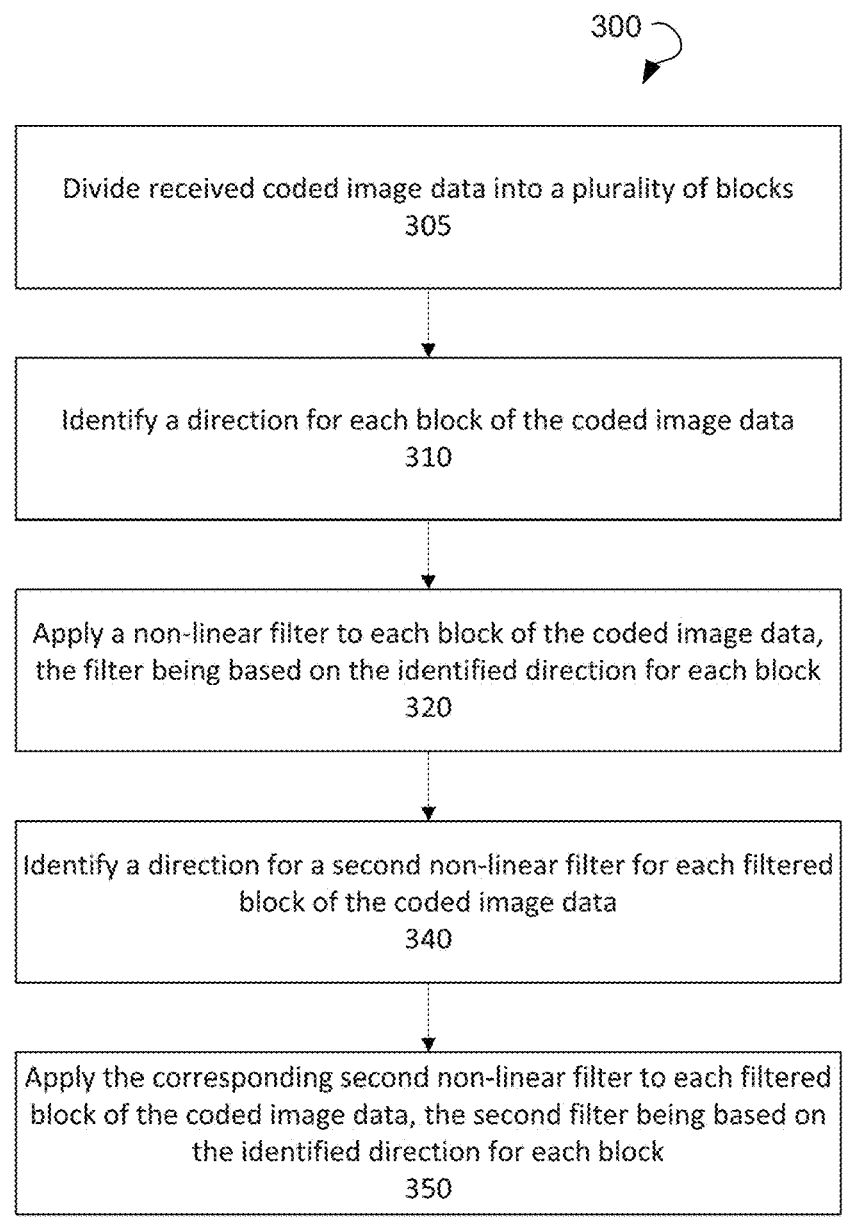
FIG. 2 shows a flow diagram of an exemplary method for creating and applying a directional deringing filter in accordance with various embodiments of the present invention.

FIG. 2 shows a flow diagram of an exemplary method 300 for creating and applying a directional deringing filter to a coded image in accordance with various embodiments of the present invention. The directional deringing filter applied in method 300 advantageously diminishes ringing artifacts caused by quantization without causing undue blurring effects. A processor, such as a processor in a still image or video encoder or decoder, may receive coded image data for an image that has undergone quantization (e.g., by quantizer 230). At step 305, the received coded image data may be divided into a plurality of blocks. The blocks of image data may have fixed or variable size, each having advantages and disadvantages. Variable-size blocks make it possible to use large blocks on long, continuous edges and small blocks where edges intersect or change direction. A fixed block size, by contrast, is easier to implement and may not require signaling the sizes on a block-by-block basis. The processor may identify a direction of the pixels in a block for each block of the image at step 310. That is, the method determines which direction best matches the pattern of pixels in each block. While several methods may be used to identify the direction of the pixels, an embodiment for determining the direction of each block is described below, in the discussion accompanying FIG. 3.

Figure 3:
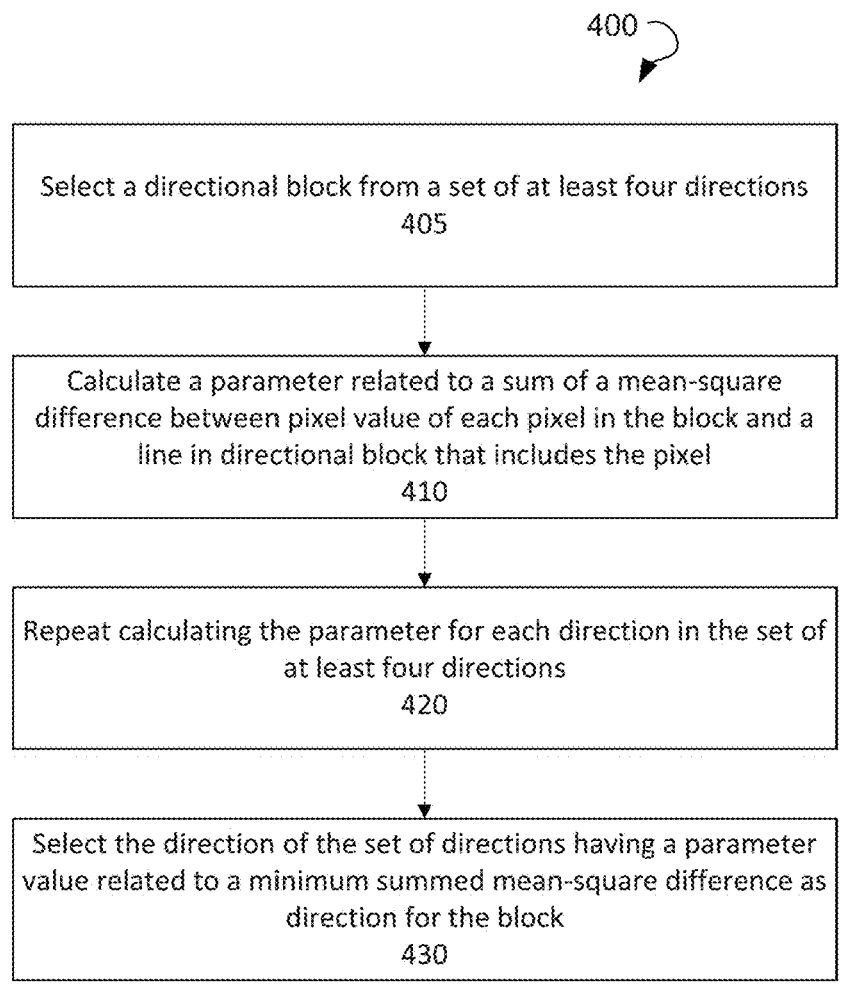
FIG. 3 shows a flow diagram of an exemplary method for determining direction of pixels within a block in accordance with various embodiments of the present invention.
Figure 4:
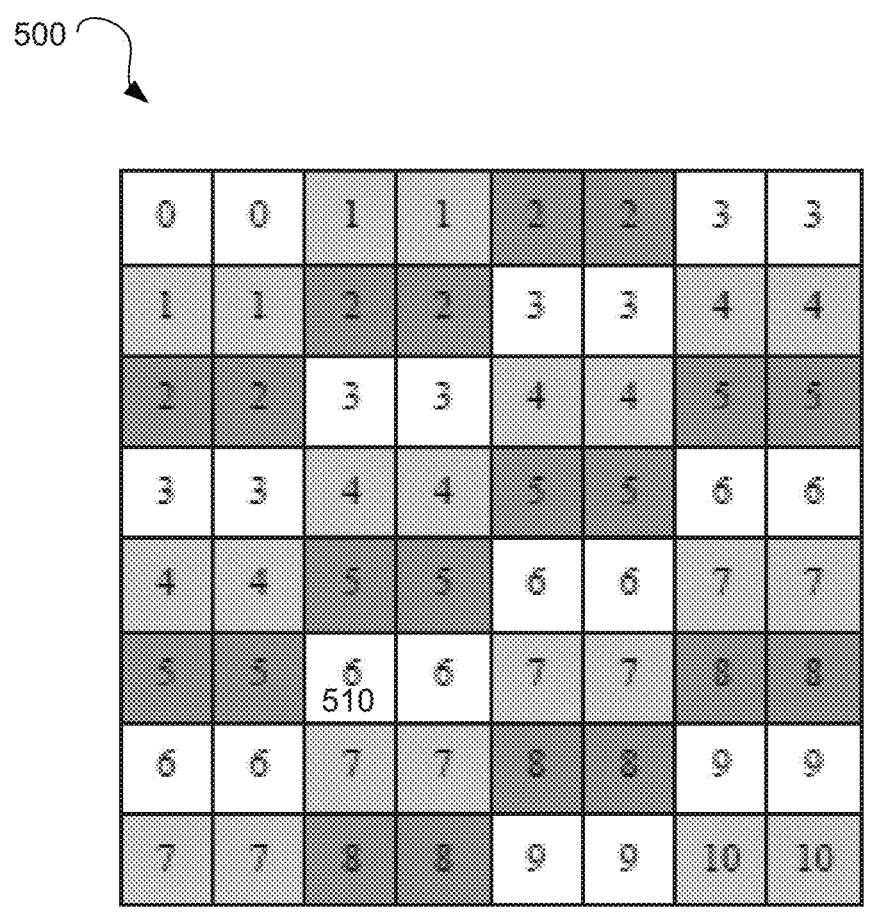
Figure 5A:
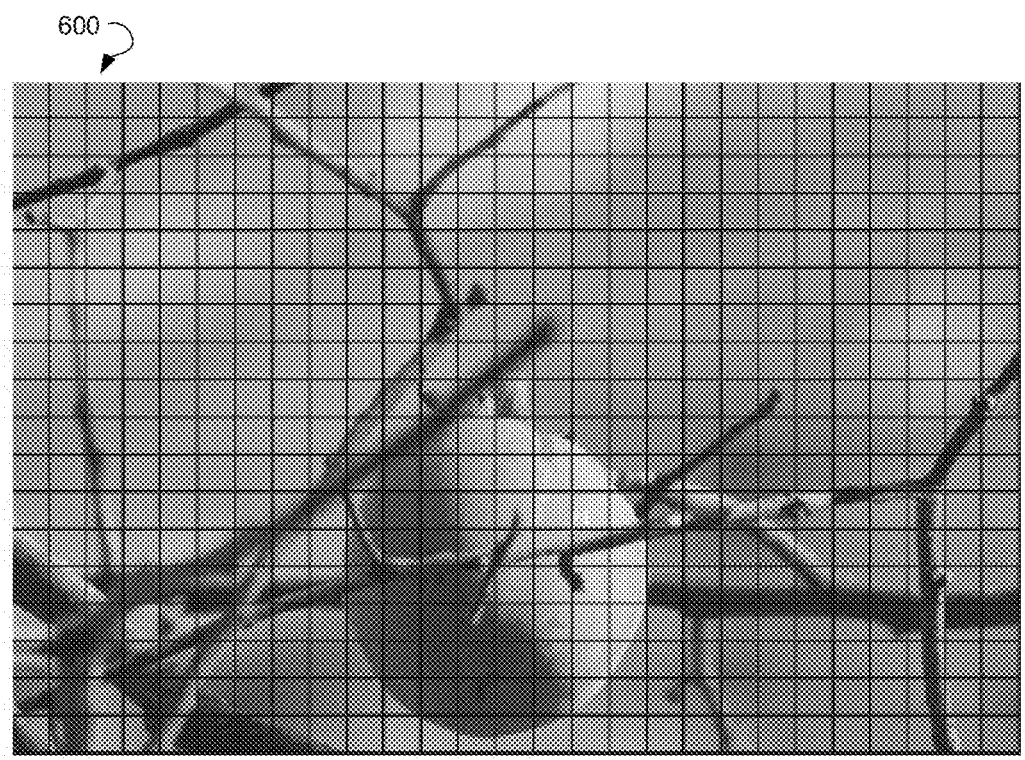
FIGS. 5A-B show an input image and a representation showing a determined direction for each block of the input image, respectively, in accordance with various embodiments of the present invention.
Figure 5B:
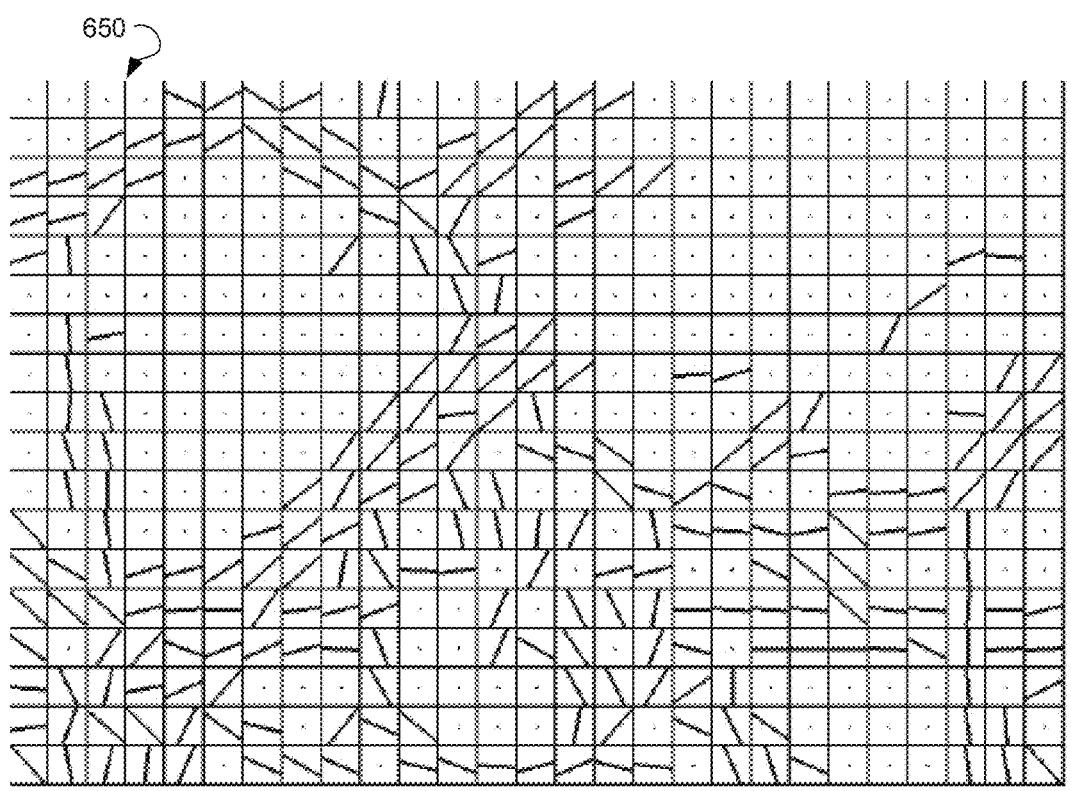

FIG. 3 shows a flow diagram of an exemplary method 400 for determining direction of pixels within a block in accordance with various embodiments of the present invention. In the example discussed in FIGS. 3-5B, a fixed square block size of eight pixels by eight pixels for a received image is used. Other block sizes, such as 16×16, or 32×32 may be used. As described above, a received coded image is divided into blocks of coded image data. FIG. 5A illustrates an exemplary coded image 600 divided into 8×8 blocks.

One way to determine the direction is to minimize mean squared difference (MSD) between the input block and a directional block (also known as a "perfectly directional block"). At step 405, a directional block may be selected having a direction from a set of at least four directions. A directional block is a block for which each line along a certain direction has a constant value. The directional block may have the same size and number of pixels as the coded image block (e.g., eight pixels by eight pixels) and may be divided into a plurality of pixel lines. For each direction, a line number may be assigned to each pixel, as shown in FIG. 4. FIG. 4 shows a directional block 500 having line numbers for pixels following a predetermined direction in a block in an exemplary embodiment of the present invention. In exemplary directional block 500, having a plurality of lines in the diagonal direction and having a zero value in the top left corner, all pixels on the line 510 have a constant value of six. The pixel lines of the directional block may be one of a set of predetermined directions. A minimum set of four predetermined directions (e.g., 0 degrees, 45 degrees, 90 degrees, and 135 degrees) is preferable in an embodiment, while other sets of directions (e.g., eight, sixteen) may also be used. At step 410, a parameter related to a sum of a mean-square difference between a pixel value of each pixel of the block, each pixel having a location in the block, and the constant value of a pixel line of the directional block that includes the location in the block of the corresponding pixel is calculated. The parameter may be the sum of the mean-square difference itself, or may be a value that is correlated to the sum of the mean-square difference. In an exemplary embodiment, the calculation may proceed as follows. First, for each direction d, the MSD may be defined as:

$$\sigma_d^2 = \frac{1}{N} \sum_{k \in block, d} \left[ \sum_{p \in P_{d,k}} (x_p - \mu_{d,k})^2 \right] \quad (1)$$

In equation (1), $x_p$ may be the value of pixel p in the coded image block, $P_{d,k}$ may be the set of pixels in line k following direction d of the directional block, N may be the total number of pixels in the block, and $\mu_k$ may be the pixel average for line k in the selected directional block. The pixel average for line k may be defined as:

$$\mu_{d,k} = \frac{1}{N_{d,k}} \sum_{p \in P_{d,k}} x_p \quad (2)$$

In equation (2), $N_{d,k}$ is the cardinality of the set $P_{d,k}$.

Comparing to the perfectly directional block in FIG. 4, instead of each pixel in the selected directional block having a line number as a pixel value (which is the case in directional block 500), each line in the selected directional block has the pixel average for line k, $\mu_k$, as the pixel value for each pixel in line k. In this manner, the decoded pixels $x_p$ are used to generate the perfectly directional block. For example, suppose the selected direction is vertical. In that case, for each vertical line in the selected block of image data, the average of the $x_p$ pixels along each vertical line k would be computed. All pixels of the perfectly directional block would be set to the computed average in each line k of the selected block of image data. That is, if the input pixel values for a 4×4 block are:

60 20 40 60
55 10 50 70
60 30 40 80
65 20 30 70 then the $\mu_k$ averages would be [60, 20, 40, 70]. Based on the computed averages, the theoretical perfectly direction block would be:

60 20 40 70
60 20 40 70
60 20 40 70
60 20 40 70

For other directions, $\mu_k$ may be computed along different lines of the selected block of image data.

In an embodiment, equations (1) and (2) may be combined and simplified to yield the optimal direction $d_{opt}$ without actually determining the minimum least square difference for every pixel. In this embodiment, the optimal direction may be expressed as:

$$d_{opt} = \max_d s_d \quad (3)$$

where:

$$s_d = \sum_{k \in block, d} \frac{1}{N_{d,k}} \left( \sum_{p \in P_{d,k}} x_p \right)^2 \quad (4)$$

By using equation 3 instead of calculating the mean-square difference, and comparing sd for each direction, the optimal direction may be determined with lesser processing cost. For example, in the embodiment using equations (3) and (4), there is no need to explicitly determine the directional blocks. Other simplifications and values may be determined for the parameter, provided that the parameter is correlated to the sum of the mean-square difference between the pixel value in the block and the pixel average of pixels on a pixel line in the directional block. At step 420, the calculating the parameter may be repeated for each of the set of directions to determine an optimal direction for the block of coded image data. The direction of the set of at least four predetermined directions having a parameter value (e.g., the maximum value for sd per equations (3) and (4)) related to a minimum summed mean-square difference may be selected as the optimal direction for the block in the exemplary embodiment described above at step 430. The process 400 is repeated for every block of the coded image data. The results of the direction identification process may be seen in FIG. 5B, which shows a representation 650 showing a determined direction for each block of the input image 600, in accordance with various embodiments of the present invention. Representation 650 shows the optimal direction for each block of the image. A dot in representation 650 indicates that there is no dominant direction. This may be caused by, for example, all pixels having the same value in the indicated block.

Returning to FIG. 2, at step 320, once the direction for each block of the image has been identified, a nonlinear filter specific to each block of the image may be applied by the processor based on the identified direction for the block. Applying the non-linear filter transforms the blocks of the image into filtered blocks of the image. The filtered blocks of the image may be stored in a data store (such as reference picture store 270).

Any nonlinear filter, such as a median filter or a bilateral filter, may be used to filter the blocks of coded image data. Another example of a nonlinear filter that may be used in directional deringing filtering is a conditional replacement filter. Just like the median filter and the bilateral filter, the conditional replacement filter is designed to remove noise without blurring sharp edges in the coded image. However, the conditional replacement filter may advantageously be simpler to compute and is easier to vectorize than the median filter or the bilateral filter. A conditional replacement filter may be applied to coded image data without using a direction of a block in some embodiments. Applying the conditional replacement filter without using the identified direction of each block may provide some deringing of the coded image data. The conditional replacement filter may also be used without using an identified direction on blocks that lack directional data, such as some text, for example.

To account for the selected direction in an embodiment, the conditional replacement filter may use a predeteterminded number of taps, wherein each tap corresponds to a pixel on a line of pixels having the selected direction. The center of the line may be the center pixel, for purposes of filtering. An important difference between a regular linear filter and the conditional replacement filter is that for each tap, if the pixel value x (n+k) differs from center pixel value for the block x (n) by at least a threshold T, then the center pixel value x(n) is substituted for the pixel value x(n+k) for the tap. In an exemplary embodiment, the filter definition can be written in terms of the differences x(n+k)−x(n), which yields:

$$y(n) = x(n) + \frac{1}{W} \sum_{k=-M, k \neq 0}^{k=M} w_k f(x(n+k) - x(n), T) \quad (5)$$

having the threshold function:

$$f(d, T) = \begin{cases} d, & |d| < T \\ 0, & \text{otherwise} \end{cases} \quad (6)$$

An advantage of calculating the conditional replacement filter in terms of differences is that the normalization by the term 1/W can be approximated without causing any bias, even when normalization factor W is not a power of two.

W is the sum of individual weighting factors $w_k$, which are multiplied by the threshold function for each tap as described above. In an exemplary embodiment, weighting factor W may be defined as $W = \sum_{k=-M}^{M} w_k$. The weights $w_k$ can be chosen so that W is a power of two, which may be less computationally intensive when performing the division shown in equation 5. For example, the video compression algorithm Daala, created by the Xiph.Org Foundation, headquartered in Somerville, Mass., currently uses w=[3 2 2] for taps 1, 2, and 3 locations away from the center pixel respectively, with W=16 (the center pixel is given a weight of 2 as well). Since the direction is constant over 8×8 blocks, all operations in this filter may be directly vectorizable over each block. In an embodiment, the weights may be used to make the filter stronger when applied to taps nearer to the pixel being filtered. This may be desirable because pixels closer to the pixel being filtered tend to be more strongly correlated with the pixel being filtered (i.e. the center pixel), and less likely to cause artifacts to be seen.

Figure 6:
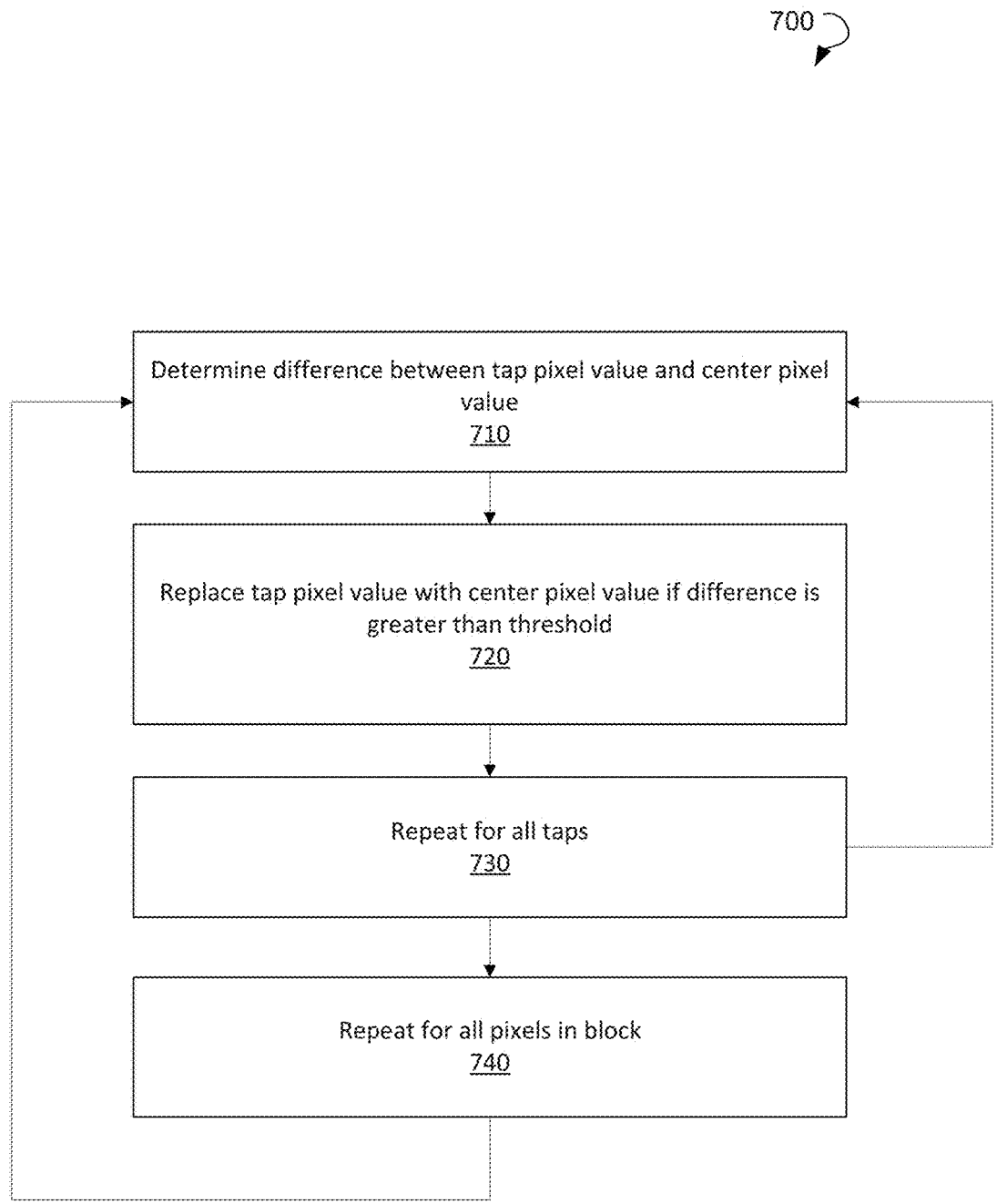
FIG. 6 shows a flow diagram of an exemplary method for applying a non-linear filter to a block of an input image in accordance with various embodiments of the present invention.

FIG. 6 shows a flow diagram of an exemplary method 700 for applying a non-linear filter, specifically a conditional replacement filter, to a block of an input image in accordance with various embodiments of the present invention. For example, the directional filter for pixel (i, j) may be defined as the 7-tap conditional replacement filter.

$$y(i, j) = x(i, j) + \frac{1}{W} \sum_{k=1}^{3} w_k [f(x(i, j) - x(i + \lfloor kd_y \rfloor, j + \lfloor kd_x \rfloor), T_d) + f(x(i, j) - x(i, j)x(i - \lfloor kd_y \rfloor, j - \lfloor kd_x \rfloor, T_d] \quad (7)$$

In equation (7), dx and dy may define the direction, W is the constant normalizing factor, and Td is the filtering threshold for the block. While the directional block-based method of determining the direction described above may be used, any suitable technique to identify the direction of the block may be used with the conditional replacement filter. The direction parameters $d_x$ and $d_y$ are shown in Table 1, assuming a set of eight predetermined directions in an exemplary embodiment. The direction parameters may be used to convert tap position in the filter to a position in the block. For example, in FIG. 4, the direction shown may be assigned a value of 1 in the set of eight predetermined directions. According to Table 1, the parameters for direction 1 are $d_x$=1and $d_y$=−½, corresponding to the lines going up only half as much as the distance the lines cover going left to right (the origin being at the top-left corner, and negative $d_y$ corresponding to up).

TABLE 1

| Exemplary Direction Parameters | | |
|---|---|---|
| Direction | $d_x$ | $d_y$ |
| 0 | 1 | −1 |
| 1 | 1 | −½ |
| 2 | 1 | 0 |
| 3 | 1 | ½ |
| 4 | 1 | 1 |
| 5 | ½ | 1 |
| 6 | 0 | 1 |
| 7 | −½ | 1 |

While seven taps are used in the filter definition of equation (7), greater or fewer taps may be used, with more taps providing greater accuracy at the expense of greater resource consumption.

Figure 7:
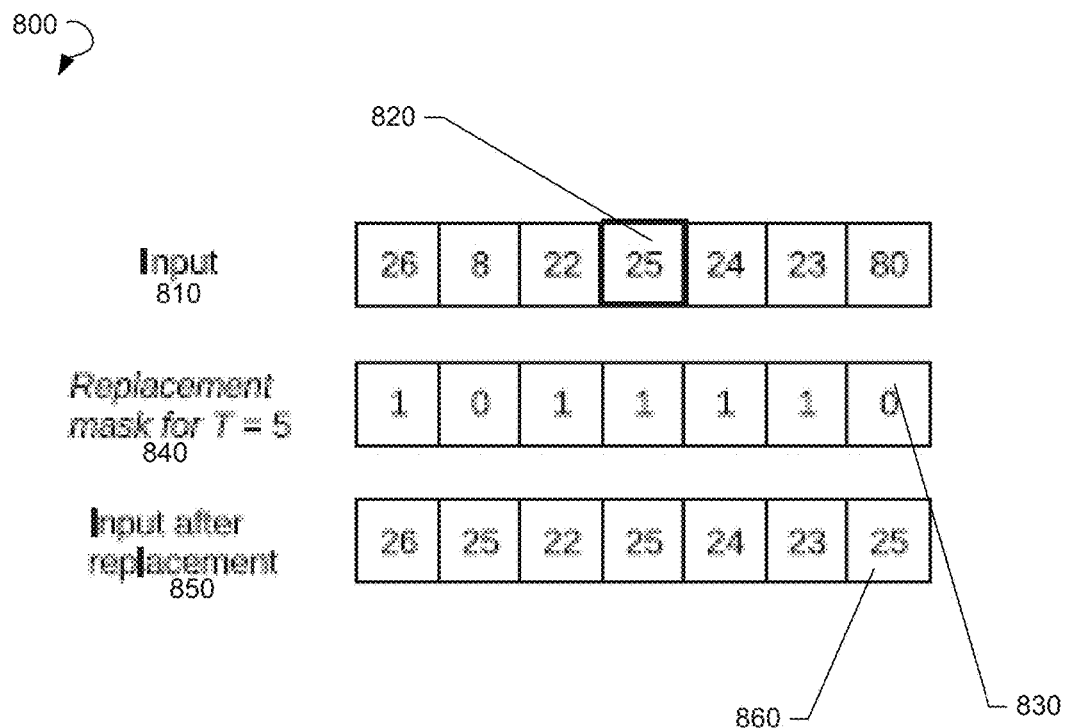
FIG. 7 shows a block diagram of an exemplary non-linear filter being applied to taps of a block of an image and pixel values for each tap.

At step 710, a difference d between a tap pixel value and the center pixel value x(n) may be determined. FIG. 7 shows a block diagram of an exemplary non-linear filter being applied to one pixel of a block of an image and pixel values used for each tap. The seven taps in direction k are shown as input coded image pixels 810 of the block being filtered. The center pixel value x(n) for the seven taps in the input pixel is the fourth pixel value 820, which is 25. If the difference d is greater than or equal to the threshold T, the tap pixel value is replaced by the center pixel value for the block at step 720. In the example shown in FIG. 7, assuming a threshold T=5, the differences may be computed using equation (6) in determining the replacement mask. The output of the replacement mask for each tap is shown in array 840, where a value of one indicates no replacement and a value of zero indicates replacement by the center pixel value. The seventh tap, having a pixel value of 80, has a difference of 55 from the center pixel value of 25, which is greater than the threshold T. Accordingly the mask indicates a zero value 830 in array 840 for the seventh tap. The determining the difference and conditional replacing of the tap pixel values are repeated for all taps at step 730.

Array 850 indicates the pixel values for each tap after replacement by the conditional replacement filter. Since the difference between the tap pixel value x(n+k) and the center pixel x(n) was greater than the threshold T for the seventh tap, the tap pixel value for the seventh tap is replaced by 25 (the center pixel value) 860 in array 850. Returning to FIG. 6, the filtering process may then be repeated for all pixels in the block at step 740.

The 7-tap directional filter may not eliminate all ringing artifacts, so an additional filtering step may be used that operates across the direction lines used in the first filter. Again returning to FIG. 2, at step 340 an optional second non-linear filter is calculated for each filtered block of the image. At step 350, the corresponding calculated second non-linear filter may be applied to each filtered block of the image, thereby transforming the filtered blocks of the image into twice-filtered blocks of the image.

The second nonlinear filter structure may, in an embodiment, be a conditional replacement filter calculated to be the same as the one in equation (7). In such a conditional replacement filter, a difference may be calculated between an input value for the tap and a center pixel value. As described above, for each tap, the difference may be compared to a second threshold, wherein the input value for the tap is replaced by the center pixel value when the difference is greater than or equal to the second threshold. Exemplary direction parameters for the second stage conditional replacement filter are shown in Table (2) and the filter weights may be set w=[1 1] with W=16/3.

TABLE 2

Exemplary Direction Parameters for Second Stage Filter

| Direction | $d_x$ | $d_y$ |
|---|---|---|
| 0 | 0 | 1 |
| 1 | 0 | 1 |
| 2 | 0 | 1 |
| 3 | 0 | 1 |
| 4 | 1 | 0 |
| 5 | 1 | 0 |
| 6 | 1 | 0 |
| 7 | 1 | 0 |

The direction parameters in Table 2 assume all taps are equal to 1, and that the direction of the second non-linear filter is either vertical or horizontal for computational efficiency. The direction of the second non-linear filter may be set to horizontal when the first non-linear filter's identified direction is closer to a vertical orientation (e.g., greater than a 45 degree angle). Similarly, if the first non-linear filter's identified direction is closer to a horizontal orientation (e.g., less than a 45 degree angle), the second non-linear filter may be set to a vertical orientation. At a 45 degree orientation (such as that shown in FIG. 4) for the identified direction of the first filter, either direction may be suitable for the second filter, although in an embodiment the horizontal orientation (i.e. 0 degrees) for the second filter may improve efficiency, by requiring fewer line buffers in hardware. Using a diagonal direction for the second filter may be done; however, such embodiments may perform worse, as gaps between the pixels that are input to the filter may arise.

Considering that the input of the second filter may have considerably less ringing than the input of the first filter (the blocks of coded image data already having been filtered once), and the fact that the second filter risks blurring edges, the calculated position-dependent pixel value threshold $T_2(i, j)$ for the second filter may be set to a smaller value than the pixel value threshold of the first filter $T_d$. The thresholds $T_d$ and $T_2$, for the first and second stage filters, must be set high enough to smooth out ringing artifacts, but low enough to avoid blurring important details in the image. Although the ringing is roughly proportional to the quantization step size Q, as the quantizer step size increases the error grows slightly less than linearly because the unquantized coefficients become very small compared to Q. As a starting point for determining the thresholds, a power model of the form $$T_0 = \alpha_1 Q^\beta \quad (8)$$

may be used, with β=0.842 in Daala, and where $\alpha_1$ depends on the input scaling, to calculate a first threshold factor $T_0$. Alpha and beta are parameters in a power law model of the threshold and may be related to the quantization in an exemplary embodiment. Other models of the threshold may be used, such as coding $T_0$ directly for the frame of image data.

A second threshold factor that may affect the optimal filtering threshold is the presence of strong directional edges/patterns. These can be estimated from the Sd parameters computed in equation (4) as:

$$\delta = s_{d_{opt}} - s_{d_{ortho}}, \quad (9)$$

where $d_{ortho} = d_{opt} + 4$ (mod 8) in the case where eight predetermined directions are included in the set of directions (the mod number is set to equal the number of directions in the set). When the second threshold factor is small, meaning that directional edges/patterns are not strong, a higher threshold (stronger filter) may be used. Likewise, when the second threshold factor is large, a lower threshold (weaker filter) may be used, to avoid blurring edges.

Figure 8A:
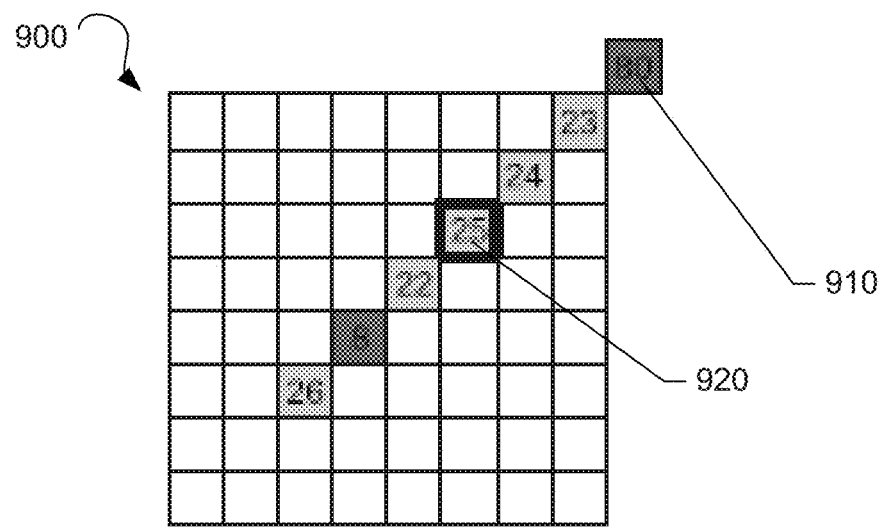
FIGS. 8A-B show block diagrams of an exemplary non-linear filter being applied to taps of a block of an image and pixel values for each tap and a secondary non-linear filter being applied to the same pixels.
Figure 8B:
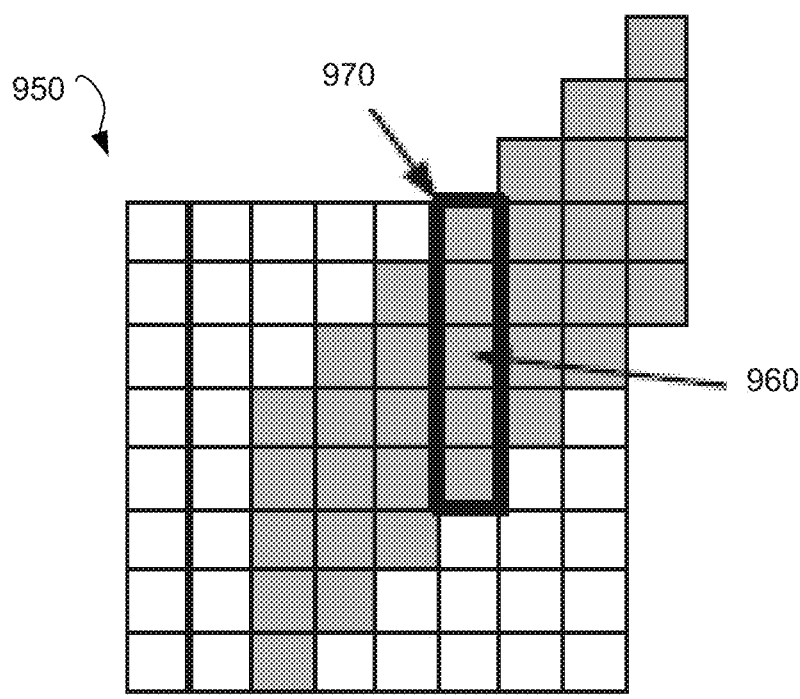

FIGS. 8A-B show block diagrams of an exemplary non-linear filter being applied to taps of a block of an image and pixel values for each tap and a secondary non-linear filter being applied to the same pixels. Block diagram 900 shows the seven taps discussed above as input pixels in input stream 810. Block 920 corresponds to the center pixel of the seven taps, and block 910 corresponds to the seventh tap, which has its pixel value replaced according to the 7-tap directional deringing filter described above. Block diagram 970 shows the same block of coded image data as diagram 900, and illustrates the pixels 970 filtered by the second stage conditional replacement filter, centered on filtered center pixel 960 (having the same location as center pixel 920).

In light of the foregoing, the direction filtering threshold for each block may be computed as:

$$T_d = T_0 \cdot \max\left(\frac{1}{2}, \min(3, \alpha_2(\delta \cdot \delta_{sb})^{1/6})\right) \quad (10)$$

where $\delta_{sb}$ is the average of the pixel values over an entire superblock (see below), and $\alpha_2$ may also depend on the input scaling. In an alternate embodiment, a threshold that is independent of $\delta_{sb}$ may be used, to avoid the need to buffer an entire superblock before applying the filters. For the second filter, a more conservative threshold may be used that depends on the amount of change caused by the directional filter:

$$T_2(i, j) = \min\left(T_d, \frac{T_d}{3} + |y(i, j) - x(i, j)|\right). \quad (11)$$

As a special case, when the pixels corresponding to the 8×8 block of image data being filtered are all skipped, then $T_d = T_2 = 0$, so no deringing is performed.

In an exemplary embodiment, the filtering may be applied one superblock at a time, conditional on a flag coded in the bit-stream. This binary flag may be the only information coded in the bitstream by the deringing filter. The flag may be only coded for superblocks that are not skipped and may be entropy-coded based on the neighbor values.

In another exemplary embodiment, the filtering may be applied one superblock at a time, where the filtering is dependent on a strength level coded in the bit-stream. This strength level may select one of a predetermined number of filter strengths, including no filter, where the selected filter strength affects the thresholds chosen for the superblock. The strength level in the bit-stream may be only coded for superblocks that are not skipped, and may be entropy-coded based on the filter strength values of neighboring superblocks.

The deringing process sometimes reads pixels that lie outside of the superblock being processed. When these pixels belong to another superblock, the filtering may, in an embodiment, use the unfiltered pixel values—even for the second stage filter—so that no dependency is added between the superblocks. This makes it possible to filter all superblocks in parallel, thereby improving the performance of the directional deringing filter. When the pixels used for a filter lie outside of the viewable image, f(d, T)=0 in equation (6) (i.e., the pixel values used are set to the center pixel value).

Figure 9:
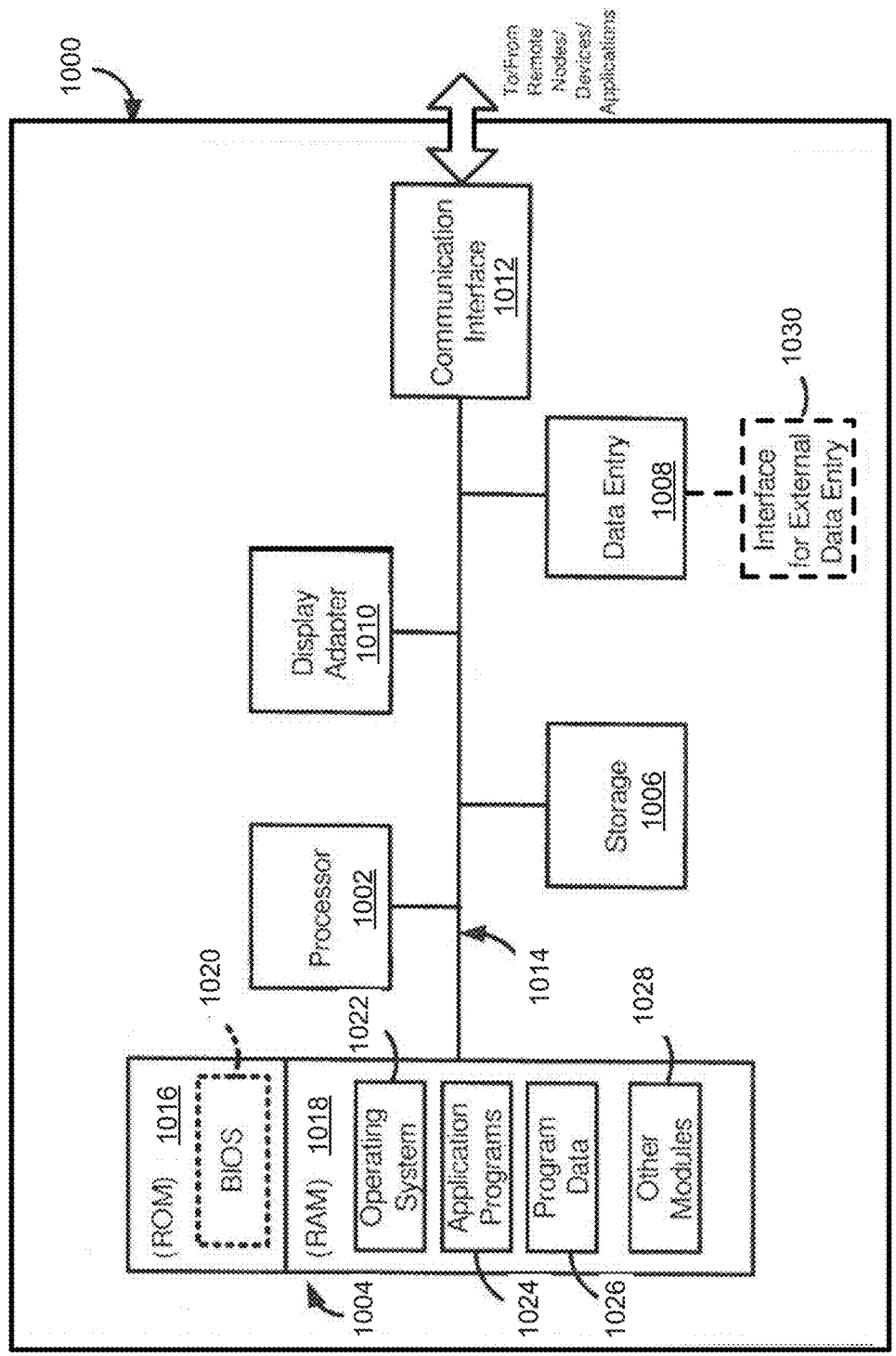
FIG. 9 is a block diagram of an exemplary system for providing a directional deringing filter in accordance with various embodiments of the present invention.

FIG. 9 is a block diagram of an exemplary system for providing a directional deringing filter in accordance with various embodiments of the present invention. With reference to FIG. 9, an exemplary system for implementing the subject matter disclosed herein, including the methods described above, includes a hardware device 1000, including a processing unit 1002, memory 1004, storage 1006, data entry module 1008, display adapter 1010, communication interface 1012, and a bus 1014 that couples elements 1004-1012 to the processing unit 1002.

The bus 1014 may comprise any type of bus architecture. Examples include a memory bus, a peripheral bus, a local bus, etc. The processing unit 1002 is an instruction execution machine, apparatus, or device and may comprise a microprocessor, a digital signal processor, a graphics processing unit, an application specific integrated circuit (ASIC), a field programmable gate array (FPGA), etc. The processing unit 1002 may be configured to execute program instructions stored in memory 1004 and/or storage 1006 and/or received via data entry module 1008.

The memory 1004 may include read only memory (ROM) 1016 and random access memory (RAM) 1018. Memory 1004 may be configured to store program instructions and data during operation of device 1000. In various embodiments, memory 1004 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1004 may also include nonvolatile memory technologies such as nonvolatile flash RAM (NVRAM) or ROM. In some embodiments, it is contemplated that memory 1004 may include a combination of technologies such as the foregoing, as well as other technologies not specifically mentioned. When the subject matter is implemented in a computer system, a basic input/output system (BIOS) 1020, containing the basic routines that help to transfer information between elements within the computer system, such as during start-up, is stored in ROM 1016.

The storage 1006 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1000.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1006, ROM 1016 or RAM 1018, including an operating system 1022, one or more applications programs 1024, program data 1026, and other program modules 1028. A user may enter commands and information into the hardware device 1000 through data entry module 1008. Data entry module 1008 may include mechanisms such as a keyboard, a touch screen, a pointing device, etc. Other external input devices (not shown) are connected to the hardware device 1000 via external data entry interface 1030. By way of example and not limitation, external input devices may include a microphone, joystick, game pad, satellite dish, scanner, or the like. In some embodiments, external input devices may include video or audio input devices such as a video camera, a still camera, etc. Data entry module 1008 may be configured to receive input from one or more users of device 1000 and to deliver such input to processing unit 1002 and/or memory 1004 via bus 1014.

The hardware device 1000 may operate in a networked environment using logical connections to one or more remote nodes (not shown) via communication interface 1012. The remote node may be another computer, a server, a router, a peer device or other common network node, and typically includes many or all of the elements described above relative to the hardware device 1000. The communication interface 1012 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1012 may include logic configured to support direct memory access (DMA) transfers between memory 1004 and other devices.

In a networked environment, program modules depicted relative to the hardware device 1000, or portions thereof, may be stored in a remote storage device, such as, for example, on a server. It will be appreciated that other hardware and/or software to establish a communications link between the hardware device 1000 and other devices may be used.

It should be understood that the arrangement of hardware device 1000 illustrated in FIG. 9 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1000. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for removing ringing artifacts from a coded image, the method comprising:
   receiving, by a processor, coded image data for an image that has undergone quantization;
   dividing, by a processor, the received coded image data into a plurality of blocks;
   identifying, by the processor, a direction for each block of the coded image data, the identifying comprising:
      selecting a directional block, the directional block having the same number of pixels as the block and being divided into a plurality of pixel lines, the pixel lines having one of a set of at least four predetermined directions, the directional block having a constant value across each pixel line;
      calculating a parameter related to a sum of a mean-square difference between a pixel value of each pixel of the block, each pixel having a location in the block, and the pixel average of pixels falling on a pixel line of the directional block that includes the location in the block of the corresponding pixel;
      repeating the calculating the parameter for each of the set of at least four predetermined directions; and
      selecting the direction of the set of at least four predetermined directions having a parameter value related to a minimum summed mean-square difference as the direction for the block;
   applying a non-linear filter, by the processor, to each block of the coded image data, the non-linear filter for each block being based on the identified direction for the block, thereby transforming the blocks of the image into filtered blocks of the image, the nonlinear filter having a definition of:

$$y(n) = x(n) + \frac{1}{W} \sum_{k=-M, k \neq 0}^{k=M} w_k f(x(n+k) - x(n), T),$$

with a threshold function defined as $$f(d, T) = \begin{cases} d, & |d| < T \\ 0, & \text{otherwise} \end{cases};$$

and
   storing, by the processor, the filtered blocks of the image in a data store.

2. The method of claim 1, the non-linear filter being applied using a predetermined number of taps, the applying the non-linear filter comprising:

for each pixel of the block, calculating a difference between an input value for the tap and a center pixel value; and comparing, for each tap, the difference to a threshold, wherein the input value for the tap is replaced by the center pixel value when the difference is greater than or equal to the threshold.

3. The method of claim 2, further comprising:

calculating, by the processor, a first threshold factor based on a quantization step size used to quantize the coded image, the first threshold factor being for the block;

calculating, by the processor, a second threshold factor based on directional edges within the block; and calculating, by the processor, the threshold based on both the first threshold factor and the second threshold factor.

4. The method of claim 1, further comprising:

identifying a direction for a second non-linear filter, by the processor, for each filtered block of the image, the direction of the second non-linear filter being different from the identified direction of the corresponding filtered block of the image; and applying, by the processor, the second non-linear filter to each corresponding filtered block of the image, the second filter being based on the identified direction for the second non-linear filter for the corresponding filtered block, thereby transforming the filtered blocks of the image into twice-filtered blocks of the image.

5. The method of claim 4, the non-linear filter being calculated based on a pixel value threshold for the non-linear filter, the second non-linear filter being applied using a predetermined number of taps, the applying the calculated second non-linear filter comprising:

for each filtered pixel of the block, calculating a difference between an input value for the tap and a center pixel value; and comparing, for each tap, the difference to a second threshold, wherein the input value for the tap is replaced by the center pixel value when the difference is greater than or equal to the second threshold, the method further comprising calculating, by the processor, the second threshold based on the pixel value threshold for the non-linear filter, the calculated second threshold having a smaller value than the pixel value threshold for the non-linear filter.

6. The method of claim 1, the applying the non-linear filter further comprising applying the non-linear filter to a plurality of blocks of the image, the plurality of blocks forming a superblock, where, if a tap used in the applying the non-linear filter to a block falls outside of the super block, an unfiltered pixel value for the tap outside of the superblock is used in the applying the corresponding calculated non-linear filter.

7. A decoder that utilizes a directional deringing filter to remove artifacts from a coded image, the decoder comprising:

a memory that stores coded image data for the coded image, the coded image having been quantized; and a processor, the processor executing instructions to:
  receive the coded image data;
  divide the received coded image data into a plurality of blocks;
  identify a direction for each block of the coded image data, the identifying comprising:
    selecting a directional block, the directional block having the same number of pixels as the block and being divided into a plurality of pixel lines, the pixel lines having one of a set of at least four predetermined directions, the directional block having a constant value across each pixel line;
    calculating a parameter related to a sum of a mean-square difference between a pixel value of each pixel of the block, each pixel having a corresponding location in the block, and the pixel average of pixels falling on a pixel line of the directional block that includes the location in the block of the corresponding pixel;
    repeating the calculating the parameter for each of the set of at least four predetermined directions; and
    selecting the direction of the set of at least four predetermined directions having a parameter value related to a minimum summed mean-square difference as the direction for the block;
  apply a non-linear filter to each block of the coded image data, the non-linear filter for each block being based on the identified direction for the block, thereby transforming the blocks of the image into filtered blocks of the image, the nonlinear filter having a definition of:

$$y(n) = x(n) + \frac{1}{W} \sum_{k=-M, k \neq 0}^{k=M} w_k f(x(n+k) - x(n), T),$$

with a threshold function defined as $$f(d, T) = \begin{cases} d, & |d| < T \\ 0, & \text{otherwise} \end{cases};$$

and
store the filtered blocks of the image in a data store.

8. The decoder of claim 7, the non-linear filter being applied using a predetermined number of taps, the instructions to apply the corresponding calculated non-linear filter comprising instructions to:

for each pixel of the block, calculate a difference between an input value for the tap and a center pixel value; and compare, for each tap, the difference to a threshold, wherein the input value for the tap is replaced by the center pixel value when the difference is greater than or equal to the threshold.

9. The decoder of claim 8, the processor further executing instructions to:

calculate a first threshold factor based on a quantization step size used to quantize the coded image, the first threshold factor being for the block;

calculate a second threshold factor based on directional edges within the block; and calculate the threshold based on both the first threshold factor and the second threshold factor.

10. The decoder of claim 7, the processor further executing instructions to:

identify a direction for a second non-linear filter for each filtered block of the image, the direction of the second non-linear filter being different from the identified direction of the corresponding filtered block of the image; and apply the corresponding calculated second non-linear filter to each corresponding filtered block of the image, the second filter being based on the identified direction for the second non-linear filter for the corresponding filtered block, thereby transforming the filtered blocks of the image into twice-filtered blocks of the image.

11. The decoder of claim 10, the non-linear filter being calculated based on a pixel value threshold for the non-linear filter, the second non-linear filter being applied using a predetermined number of taps, the instructions to apply the corresponding calculated second non-linear filter comprising instructions to:

for each filtered pixel of the block, calculate a difference between an input value for the tap and a center pixel value; and compare, for each tap, the difference to a second threshold, wherein the input value for the tap is replaced by the center pixel value when the difference is greater than or equal to the second threshold, the method further comprising calculating, by the processor, the second threshold based on the pixel value threshold for the non-linear filter, the calculated second threshold having a smaller value than the pixel value threshold for the non-linear filter.

12. The decoder of claim 7, the instructions to apply the non-linear filter further comprising instructions to apply the non-linear filter to a plurality of blocks of the image, the plurality of blocks forming a superblock, where, if a tap used in the applying the non-linear filter to a block falls outside of the super block, an unfiltered pixel value for the tap outside of the superblock is used in the applying the corresponding calculated non-linear filter.

13. A computer program product comprising computer-readable program code to be executed by one or more processors when retrieved from a non-transitory computer-readable medium, the program code including instructions to:

receive coded image data for an image that has undergone quantization;

divide the received coded image data into a plurality of blocks;

identify a direction for each block of the coded image data, the identifying comprising:

selecting a directional block to compare with a block of the plurality of blocks, the directional block having the same number of pixels as the block and being divided into a plurality of pixel lines, the pixel lines having one of a set of at least four predetermined directions, the directional block having a constant value across each pixel line;

calculating parameter related to a sum of a mean-square difference between a pixel value of each pixel of the block, each pixel having a location in the block, and the pixel average of pixels falling on a pixel line of the directional block that includes the location in the block of the corresponding pixel;

repeating the calculating the parameter for each of the set of at least four predetermined directions; and selecting the direction of the set of at least four predetermined directions having parameter value related to a minimum summed mean-square difference as the direction for the block;

apply a non-linear filter to each block of the coded image data, the non-linear filter for each block being based on the identified direction for the block, thereby transforming the blocks of the image into filtered blocks of the image, the nonlinear filter having a definition of:

$$y(n) = x(n) + \frac{1}{W} \sum_{k=-M, k \neq 0}^{k=M} w_k f(x(n+k) - x(n), T),$$

with a threshold function defined as $$f(d, T) = \begin{cases} d, & |d| < T \\ 0, & \text{otherwise} \end{cases};$$

and store the filtered blocks of the image in a data store.

14. The computer program product of claim 13, the non-linear filter being applied using a predetermined number of taps, the instructions to apply the corresponding calculated non-linear filter comprising instructions to:

for each pixel of the block, calculate a difference between an input value for the tap and a center pixel value; and compare, for each tap, the difference to a threshold, wherein the input value for the tap is replaced by the center pixel value when the difference is greater than or equal to the threshold.

15. The computer program product of claim 14, the program code further including instructions to:

calculate a first threshold factor based on a quantization step size used to quantize the coded image, the first threshold factor being for the block;

calculate a second threshold factor based on directional edges within the block; and calculate the threshold based on both the first threshold factor and the second threshold factor.

16. The computer program product of claim 13, the program code further including instructions to:

identify a direction for a second non-linear filter for each filtered block of the image, the direction of the second non-linear filter being different from the identified direction of each corresponding filtered block of the image; and apply the corresponding calculated second non-linear filter to each corresponding filtered block of the image, the second filter being based on the identified direction for the second non-linear filter for the corresponding filtered block, thereby transforming the filtered blocks of the image into twice-filtered blocks of the image.

17. The computer program product of claim 16, the non-linear filter being calculated based on a pixel value threshold for the non-linear filter, the second non-linear filter being applied using a predetermined number of taps, the instructions to apply the corresponding calculated second non-linear filter comprising instructions to:

for each filtered pixel of the block, calculate a difference between an input value for the tap and a center pixel value; and compare, for each tap, the difference to a second threshold, wherein the input value for the tap is replaced by the center pixel value when the difference is greater than or equal to the second threshold, the method further comprising calculating, by the processor, the second threshold based on the pixel value threshold for the non-linear filter, the calculated second threshold having a smaller value than the pixel value threshold for the non-linear filter.

18. A method for removing ringing artifacts from a coded image, the method comprising:

receiving, by a processor, coded image data for an image that has undergone quantization;

dividing, by a processor, the received coded image data into a plurality of blocks;

applying a conditional replacement filter, by the processor, to each block of the coded image data using a predetermined number of taps, the conditional replacement filter having a definition of:

$$y(n) = x(n) + \frac{1}{W} \sum_{k=-M, k \neq 0}^{k=M} w_k f(x(n+k) - x(n), T)$$

with a threshold function defined as $$f(d, T) = \begin{cases} d, & |d| < T \\ 0, & \text{otherwise} \end{cases},$$

the conditional replacement filter being applied by:

selecting a pixel to be filtered;

calculating a difference between an input value for each of the number of taps and a center pixel value, the center pixel value being a pixel value of the selected pixel;

replacing the input value for a tap of the number of taps if the difference for the tap is greater than a threshold; and repeating the selecting, calculating, and replacing for each pixel of the block; and storing, by the processor, the filtered blocks of the image in a data store.

19. A method for removing ringing artifacts from a coded image, the method comprising:

receiving, by a processor, coded image data for an image that has undergone quantization;

dividing, by a processor, the received coded image data into a plurality of blocks;

identifying, by the processor, a direction for each block of the coded image data;

applying a conditional replacement filter, by the processor, to each block of the coded image data, the conditional replacement filter having a definition of:

$$y(n) = x(n) + \frac{1}{W} \sum_{k=-M, k \neq 0}^{k=M} w_k f(x(n+k) - x(n), T)$$

with a threshold function defined as $$f(d, T) = \begin{cases} d, & |d| < T \\ 0, & \text{otherwise} \end{cases},$$

the conditional replacement filter being applied using a predetermined number of taps, where each tap corresponds to a pixel on a line of pixels, within a block, having the identified direction for the block, the line of pixels having a center pixel, the applying the conditional replacement filter comprising:

for each pixel of the block, calculating a difference between an input value for each tap of the predetermined number of taps and a center pixel value; and comparing, for each tap, the difference to a threshold, wherein the input value for each tap is replaced by the center pixel value when the difference is greater than or equal to the threshold; and storing, by the processor, the filtered blocks of the image in a data store.

20. The method of claim 19, wherein identifying a direction for each block of the coded image data comprises:

selecting a directional block, the directional block having the same number of pixels as the block and being divided into a plurality of pixel lines, the pixel lines having one of a set of at least four predetermined directions, the directional block having a constant value across each pixel line;

calculating a parameter related to a sum of a mean-square difference between a pixel value of each pixel of the block, each pixel having a location in the block, and the pixel average of pixels falling on a pixel line of the directional block that includes the location in the block of the corresponding pixel;

repeating the calculating the parameter for each of the set of at least four predetermined directions; and selecting the direction of the set of at least four predetermined directions having a parameter value related to a minimum summed mean-square difference as the direction for the block.

* * * * *